(12) United States Patent
Michaelsen et al.

(10) Patent No.: US 7,906,003 B2
(45) Date of Patent: *Mar. 15, 2011

(54) SUBSEA PRODUCTION SYSTEM

(75) Inventors: Jarle Michaelsen, Houston, TX (US); Paal J. Nilsen, Boedalen (NO)

(73) Assignee: Hamworthy PLC, Poole (GB)

( * ) Notice: Subject to any disclaimer, the term of this patent is extended or adjusted under 35 U.S.C. 154(b) by 1088 days.

This patent is subject to a terminal disclaimer.

(21) Appl. No.: 11/656,187

(22) Filed: Jan. 22, 2007

(65) Prior Publication Data

US 2007/0144908 A1    Jun. 28, 2007

Related U.S. Application Data

(63) Continuation of application No. 10/360,387, filed on Feb. 7, 2003, now Pat. No. 7,175,748.

(60) Provisional application No. 60/425,377, filed on Nov. 12, 2002, provisional application No. 60/356,108, filed on Feb. 11, 2002.

(51) Int. Cl.
*B03C 5/02* (2006.01)
*E21B 34/04* (2006.01)
*B09C 1/00* (2006.01)

(52) U.S. Cl. ........ 204/547; 204/643; 166/357; 166/267; 210/747; 210/748.01; 210/170.11

(58) Field of Classification Search .................. 210/747, 210/170, 748; 166/357, 267; 204/513, 514, 204/547, 643, 660

See application file for complete search history.

(56) References Cited

U.S. PATENT DOCUMENTS

| 3,638,720 | A | 2/1972 | Thomas |
| 3,705,626 | A | 12/1972 | Glenn |
| 4,261,820 | A | 4/1981 | Geurtsen |
| 4,830,755 | A | 5/1989 | Hardin |
| 6,207,032 | B1 | 3/2001 | Buchanan |
| 7,175,748 | B2 * | 2/2007 | Michaelsen et al. .......... 204/547 |

FOREIGN PATENT DOCUMENTS

| FR | 2774924 |   | 8/1999 |
| GB | 2242373 | A | 10/1991 |
| NO | 20015454 |  | 11/2001 |
| NO | 20023181 |  | 6/2002 |
| WO | WO01/71158 | A1 | 9/2001 |

* cited by examiner

*Primary Examiner* — Alex Noguerola
(74) *Attorney, Agent, or Firm* — Venable LLP; Eric J. Franklin

(57) ABSTRACT

A well fluid processing system has a separator for separating heavier and lighter components of well fluid flowing from a subsea well and directing the lighter components to flow to a surface processing facility. The separator has a cylindrical chamber having a length at least ten times its diameter. A coalescing unit located in the chamber causes water droplets in the well fluid flowing through the tubes to coalesce into larger droplets. A dielectrophoresis unit having undulating sheets spaced close to each other is also located in the chamber. The sheets of the unit are supplied with an electrical potential to force the water droplets into predetermined passage portions to form high water content sections of liquid. Bypass valves allow backflushing of one of the separators while others continue to operate.

10 Claims, 2 Drawing Sheets

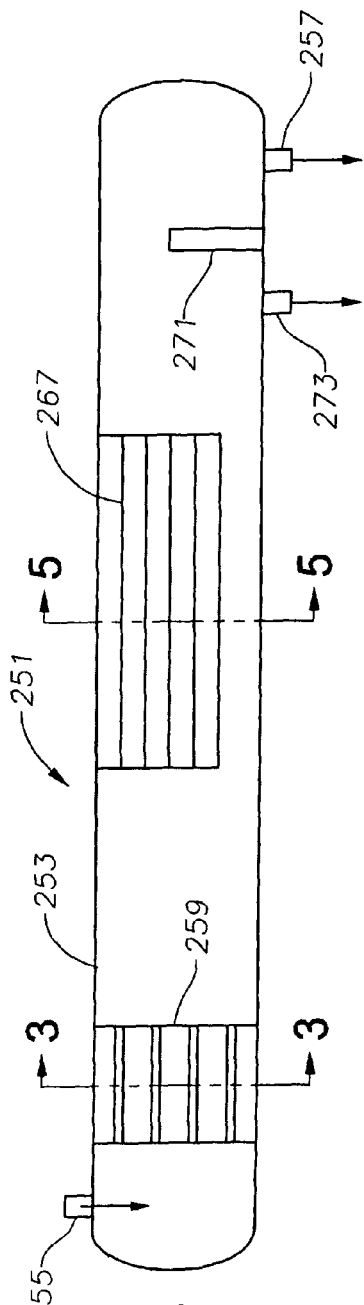
Fig. 2
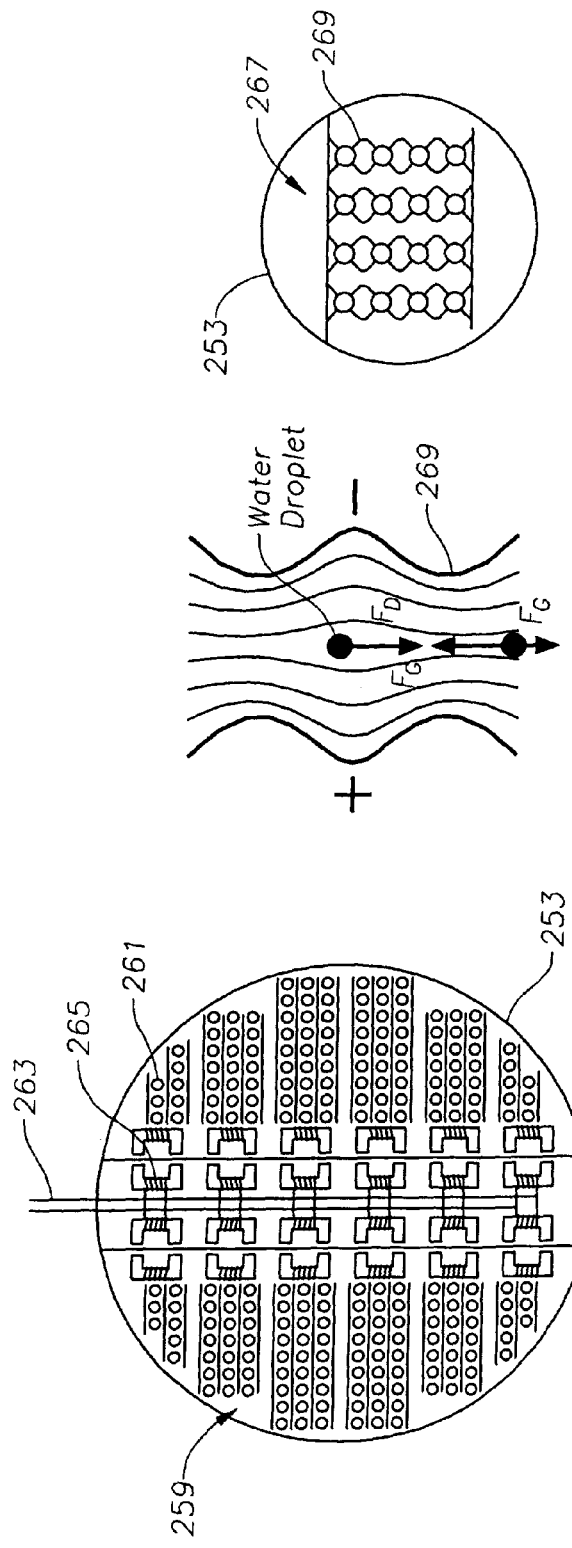
Fig. 5
Fig. 4
Fig. 3

SUBSEA PRODUCTION SYSTEM

This application is a continuation of application Ser. No. 10/360,387, filed Feb. 7, 2003 now U.S. Pat. No. 7,175,748, which claimed the benefit of provisional application Ser. No. 60/356,108, filed Feb. 11, 2002 and provisional application Ser. No. 60/425,377, filed Nov. 12, 2002.

FIELD OF THE INVENTION

This invention relates in general to well fluid processing systems and in particular to a subsea system.

BACKGROUND OF THE INVENTION

Oil and gas wells typically produce a well fluid that requires separation to remove formation water from the flow stream. With subsea wells, the separation typically takes place on a production platform or vessel. This usually requires pumping the well fluid, including the formation water, to the surface production facility. In deep water installations, thousands of feet deep, the energy required to pump the water is extensive.

Locating the separation unit subsea has been proposed and done on at least one occasion. The environment of a subsea separation unit and a surface unit differs because of the high hydrostatic forces imposed on the separation vessels. While vessels can be made stronger, generally this results in a larger size and weight. Larger size and weight increase the difficulty of deploying the units.

Also, separators commonly require maintenance because of sand accumulation and mineral deposits on the components. Once installed subsea, maintenance becomes difficult because of the sea depths. Further, shutting down a separation system for maintenance would normally require shutting off well flow, which is expensive.

SUMMARY OF THE INVENTION

In this invention, a choke located downstream of the separator for limiting the flow rate of well fluid from the subsea well. The placement of the choke allows higher operating pressures in the separator, which facilitates separation. The separator has a cylindrical chamber, preferably with a length at least ten times its diameter. A coalescing unit having a plurality of tubes to which an electrical potential is applied is located in the chamber to cause water droplets in the well fluid flowing through the tubes to coalesce into larger droplets. Also, preferably a dielectrophoresis unit is located in the chamber downstream of the coalescent unit. The dielectrophoresis unit has a pair of undulating sheets spaced close to each other, the sheets being supplied with an electrical potential to force the water droplets in the well fluid into predetermined passage portions between the sheets to form high water content sections of liquid.

In the preferred embodiment, the system has a number of separators for separating heavier and lighter components of well fluid, each of the separators having a heavier component outlet and a lighter component outlet. A pump has an intake connected to each of the heavier component outlets of the separators. A disposal line is connected to an outlet of the pump and leads to a disposal location for pumping the heavier components to the disposal location. Bypass conduits are connected between the outlet of the pump and the heavier component outlets of the separators. When actuated, bypass valves in the bypass conduits cause at least some of the heavier components being pumped by the pump to flow back into the heavier component outlet of the one of the separators for backflushing while the heavier components from the other separators continue to flow through the second heavier component line to the inlet of the pump.

BRIEF DESCRIPTION OF THE DRAWINGS

FIG. 2 is a schematic sectional view of one of the separators shown in FIG. 1.

FIG. 3 is an enlarged schematic sectional view of the separator of FIG. 2, taken along the line 3-3 of FIG. 2, illustrating the coalescence separator portion.

FIG. 4 is an enlarged schematic view of a dielectrophoresis separator portion of the separator of FIG. 2.

FIG. 5 is an enlarged schematic sectional view of the separator of FIG. 2, taken along the line 5-5 of FIG. 2, illustrating the dielectrophoresis separator portion.

DETAILED DESCRIPTION OF THE INVENTION

Figure 1:
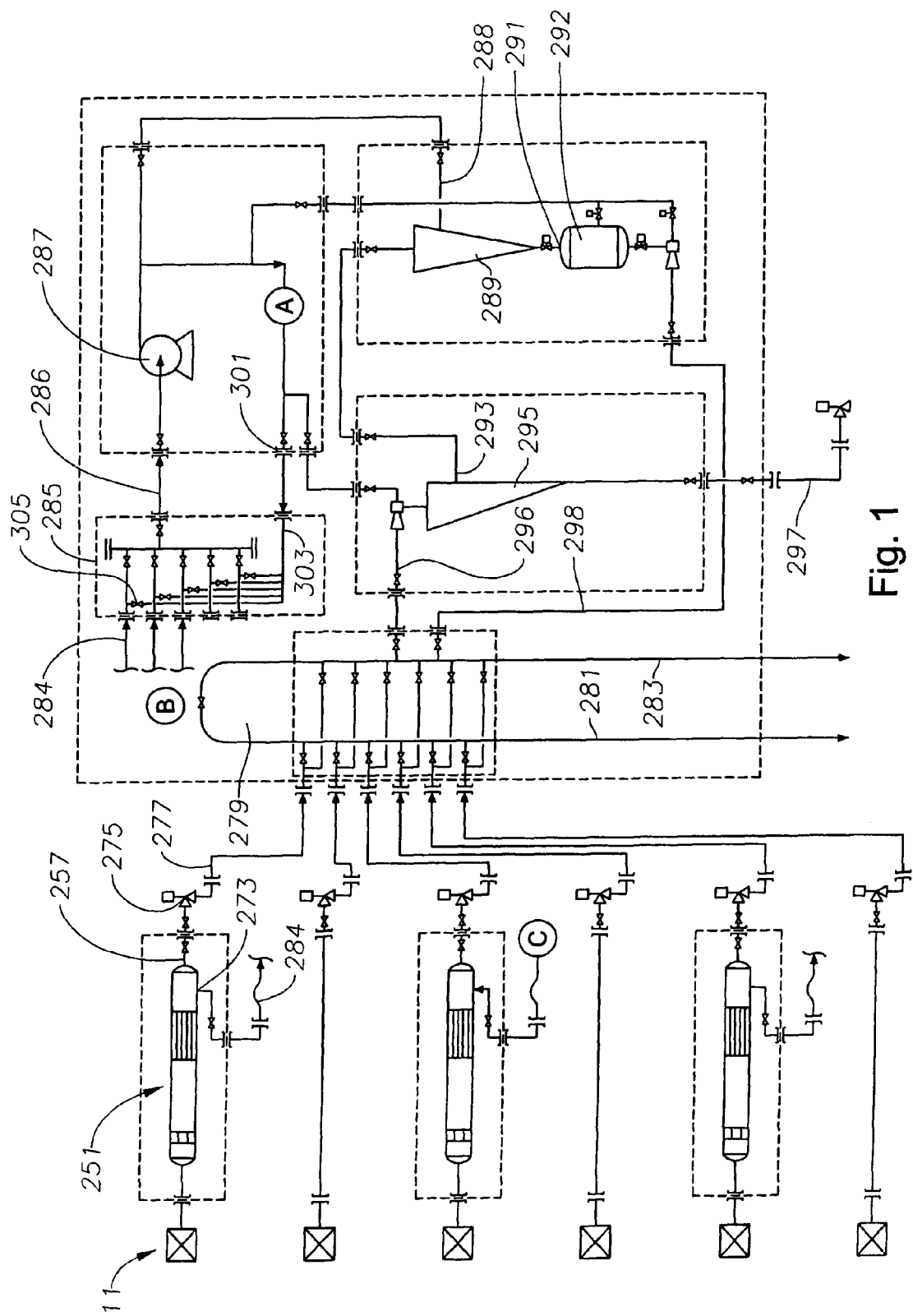
FIG. 1 is a schematic of a production system for a wellhead assembly.

FIG. 1 illustrates schematically a subsea processing system for the various wells 11 within a field. The subsea processing systems separates water and sand. The system includes a plurality of separators 251. A single separator 251 may be utilized with each subsea well assembly 11, or more than one well 11 may feed into a separator 251. Separator 251, as shown in FIG. 2, comprises a horizontal vessel 253 that locates on the sea floor. Generally, greater water depths will require a higher wellhead pressure with corresponding lower actual gas volumes when separation takes place at the sea floor. Lower gas volumes are beneficial for oil/water separation because fewer gas bubbles will move vertically and disturb the horizontal flow pattern generated by the oil and water flowing through the separator vessel 253. The low gas percentage also allows more of the separator vessel to be utilized for oil/water separation.

In addition to the issue described above, higher pressure in itself within separator vessel 253 will impact the separation. Preliminary results show that separation occurs easier at higher pressures. This can be caused by the fact that high pressure causes the liquid hydrocarbon fraction to be lighter, hence increase the density difference between water and oil. The oil fraction becomes lighter because lighter hydrocarbon fractions are liquefied at the higher pressure, hence if combined with the heavier fractions, the combination can reduce the overall density of the liquid hydrocarbon phase. Separator vessel 253 is designed to withstand the high external pressure due to the very deep water. Also, conservative design does not allow one to reduce the designed pressure differential due to internal pressure. Generally, smaller diameters will give thinner wall thickness for the same external pressure. For example, a 2.8 meter diameter cylinder requires 140 millimeters wall thickness to withstand a selected pressure. A 2.5 meter diameter cylinder will withstand the same pressure with a wall thickness of 25 millimeters. Consequently, separator 253 has a relatively small diameter, preferably no more than $\frac{1}{10}^{th}$ its length.

Separator 251 may be of various types for separating water and oil. In this embodiment, separator 253 employs a coalescent unit 259. Coalescent unit 259 has a plurality of passages 261 within it. FIG. 3 shows the large number of separate passages 261 located within vessel tubes 261. An electrostatic field is applied to the oil and water mixture at the tubes or passages 261. By exposing the mixture of water and oil to an electrostatic field, the dipolar water droplets contained in the oil phase will be oriented in a way that makes them collide or coalesce with each other. This causes the water droplets to grow to bigger droplets. Generally, bigger droplets move and separate faster than smaller droplets. Consequently, a first separation from water and oil takes place in coalescent unit 259. This reduces the required retention time to get the water content out of the oil produced, allowing the separator vessel 253 diameter/size to be reduced.

As shown in FIG. 3, preferably low voltage supplied subsea is routed through low voltage wires 263 into the interior of separator vessel 253. A plurality of transformers 265 transform the low voltage to high voltage that is required for providing the electrostatic field. The same low voltage power supply is utilized for other functions, such as operating the solenoids and sensors involved with control of each subsea well 11.

If coalescent unit 259 is not adequate to reach the desired water content, a second stage could be employed. A second stage could be another coalescent unit 259 or it could be a unit of a different type, such as dielectrophoresis unit 267. Unit 267 also uses an electrostatic field, however the field is configured to force the water droplets into designated sections of the separator and thereby form streams of water. Electrode sheets 269, as shown in FIGS. 4 and 5, have undulations. Electrode sheets 269 are closely spaced and arranged with the constrictive portions where two valleys are separated by the widened portions where two peaks are spaced across from each other. Sheets 269 force the water droplets to move towards the stronger section of the electrostatic field with stronger field gradients. The forces imposed by the gradient field are in the order of magnitude two to five times greater than the gravity force. This phenomenon is used to guide the water droplets into these predetermined sections, where they form continuous sections of water for use in separation. Dielectrophoresis unit 267 reduces the time normally needed for a conventional gravity separator.

Referring again to FIG. 2, a bulkhead 271 extends upward from separator vessel 253 near its downstream end. Bulkhead 271 divides a section for collecting higher water concentrations. A water outlet 273 is located upstream of bulkhead 271. Oil and water inlet 255 is located on an upper side of the upstream end of separator vessel 253. Oil outlet 257 is located on the downstream end of separator vessel 253 on the lower side.

Referring back to FIG. 1, a choke 275 is located downstream of oil outlet 257. Choke 275 is a conventional device that provides a variable orifice for increasing pressure upstream and decreasing flow. One of the chokes 275 is typically located on the tree of each of the subsea wells 11. Choke 275 is adjusted to create a higher pressure within separator 251 to enhance separation, as previously mentioned.

A flowline jumper 277 connects choke 275 to manifold 279. Choke 275 could be incorporated as part of flowline jumper 277 such that it is lowered and installed with jumper 277. Alternately, choke 275 could be mounted to manifold 279.

Manifold 279 is a conventional unit that has a pair of lines 281 and 283 that lead to the surface for delivery of the separated oil and any entrained gas therein. All of the various separators 251 lead to manifold 279.

The separated water outlet 273 connects to a flowline 284, which leads to a valving module 285. The various flowlines 284 join each other in module 285, with the combined flow leading to an intake line 286 of a subsea pump 287. Flowlines 281 and 283 lead back to a surface processing unit for transporting the oil. Water pump 287 discharges through a line 288 into a vortex separator 289. Vortex separator 289 has an output 291 that leads back to an injection well for injecting the separated water. The output is a mixture of water and in many cases of sand that has been produced from the formation. The higher content of sand flows through output line 297. The free water 293 flows back to a second separator 295 that leads to flowline 291 for injecting into a well. The second vortex separator 295 separates any remaining oil from the water and delivers the oil through line 296 back to manifold 279 for commingling with the other oil being produced through lines 281 and 283. Similarly, any oil washed from the sand and sand collection vessel 292 is filtered and returned via line 298 to manifold line 283. Vortex separator 289 thus separates sand from liquid, while vortex separator 295 separates any remaining oil from the water.

A valve 301 is connected to a line 303 that leads from the output of pump 287. Line 303 branches into separate lines, each connected to one of the lines 284 leading from one of the separators 251. Each line has a valve 305. Opening valves 301 and 305 enables water to flow backwards through one of the water outlet lines 284 into the water outlet 273 for backflushing. Sand and other deposits accumulate in the subsea separation vessel 253. These sands and/or deposits are removed from separator 251 by the backflushing injection through line 284. The injection of water creates turbulence within separator vessel 253 to cause the sand and other deposits to flow out with the produced oil out of manifold lines 281 and 283.

The invention has significant advantages. Locating the choke downstream of the separator allows higher operating pressures in the separator. The combination of a coalescence unit and a dielectrophoresis unit within a small diameter separators provides a compact subsea processing unit. The backflushing capability reduces maintenance.

While the invention has been shown in only one of its forms, it should be apparent to those skilled in the art that it is not so limited but is susceptible to various changes without departing from the scope of the invention.

The invention claimed is:

1. A subsea-well fluid processing system, comprising:
  a well fluid separator for separating heavier and lighter components of well fluid flowing from a well and directing the lighter components to flow to a surface processing facility; wherein the separator comprises:
  a coalescing unit having a plurality of passages to which an electrical potential is applied to cause water droplets in the well fluid flowing through the passages to coalesce into larger droplets; and
  a dielectrophoresis unit having a pair of undulating sheets spaced close to each other, the sheets being supplied with an electrical potential to force the water droplets in the well fluid into predetermined passage portions between the sheets to form high water content sections of liquid.

2. The system according to claim 1, wherein the separator comprises:
  a cylindrical chamber having a length at least ten times its diameter.

3. The system according to claim 1, wherein the dielectrophoresis unit is located downstream from the coalescing unit within the separator.

4. A method of processing well fluid from a well, comprising:
  (a) providing a well fluid separator having a plurality of passages and a pair of closely spaced undulating sheets, and connecting an inlet of the separator to the well;
  (b) flowing well fluid from the well to the inlet of the separator, applying an electrical potential to passages to cause water droplets in the well fluid flowing through the passages to coalesce into larger droplets;

(c) applying an electrical potential to the undulating sheets spaced close to each other to force the water droplets in the well fluid into predetermined passage portions between the sheets to form high water content sections of liquid, thereby separating heavier and light components of the well fluid; and (d) directing the lighter components to flow to a processing facility.

5. The method according to claim 4, wherein the passages are located upstream of the sheets.

6. A separator for separating water and oil components of well fluid flowing from a well and directing the oil components to flow to a processing facility; the separator comprising:

a pressure vessel having an inlet for receiving well fluid made up of a mixture of oil and water, the vessel having an oil outlet and a water outlet;

a coalescing unit located in the vessel and having a plurality of parallel passages through which the well fluid from the inlet flows, the passages having an electrical potential to cause water droplets in the well fluid flowing through the passages to coalesce into larger droplets; and a dielectrophoresis unit located in the vessel downstream from the coalescing unit and having at least two sheet members spaced apart from each other, defining a plurality of passage portions of varying widths therebetween for receiving well fluid flowing from the coalescing unit, the sheet members being supplied with an electrical potential between them to force the water droplets in the well fluid flowing between the sheet members into certain ones of the passage portions between the sheet members to form high water content sections of liquid;

a water collection area in the vessel in fluid communication with the water outlet for collecting and discharging water that drains from the units; and an oil collection area in the vessel in fluid communication with the oil outlet for collecting and discharging oil that drains from the units.

7. The separator according to claim 6, wherein:

each of the sheet members has an undulating shape, defining peaks and valleys; and the peaks of the one of the sheet members align with the peaks of the other of the sheet members, the passage portions between the peaks being wider than the passage portions between the valleys.

8. The separator according to claim 7, wherein:

the sheet members are oriented so that the wider and narrower passage portions alternate one above the other.

9. The separator according to claim 6, wherein the coalescing unit comprises a bundles of tubes, each of the tubes defining one of the passages.

10. The separator according to claim 6, wherein:

the pressure vessel is cylindrical, having a length at least ten times its diameter; and the passages of the coalescing unit and the passage portions of the dielectrophoresis unit extend generally parallel with an axis of the vessel.

* * * * *